United States Patent
Ersoy et al.

(10) Patent No.: US 7,828,307 B2
(45) Date of Patent: Nov. 9, 2010

(54) STABILIZER ARRANGEMENT FOR A MOTOR VEHICLE WITH ADJUSTABLE ROCKER PENDULUM

(75) Inventors: Metin Ersoy, Walluf (DE); Jens Vortmeyer, Preussisch Oldendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 933 days.

(21) Appl. No.: 11/569,530

(22) PCT Filed: May 18, 2005

(86) PCT No.: PCT/DE2005/000910

§ 371 (c)(1),
(2), (4) Date: Nov. 22, 2006

(87) PCT Pub. No.: WO2005/113273

PCT Pub. Date: Dec. 1, 2005

(65) Prior Publication Data

US 2008/0067769 A1  Mar. 20, 2008

(30) Foreign Application Priority Data

May 24, 2004  (DE) .................. 10 2004 025 806

(51) Int. Cl.
*B60G 17/04* (2006.01)
*B60G 21/055* (2006.01)
(52) U.S. Cl. .................. 280/124.107; 280/124.162; 188/316
(58) Field of Classification Search .......... 280/124.106, 280/124.107, 124.152, 124.154, 124.162, 280/5.508; 188/316, 317, 318, 322.14
See application file for complete search history.

(56) References Cited

U.S. PATENT DOCUMENTS

| 3,584,712 | A | * | 6/1971 | Dickinson | 188/282.1 |
| 3,972,396 | A | * | 8/1976 | Bochnak | 188/312 |
| 4,054,277 | A | * | 10/1977 | Sirven | 267/35 |
| 4,480,555 | A | * | 11/1984 | Shafer et al. | 105/199.1 |
| 4,500,075 | A | * | 2/1985 | Tsuchiya et al. | 267/226 |
| 4,844,506 | A | * | 7/1989 | Moriguchi et al. | 280/5.51 |
| 4,973,077 | A |   | 11/1990 | Kuwayama et al. | |

(Continued)

FOREIGN PATENT DOCUMENTS

DE  37 80 268 T2  12/1992

(Continued)

*Primary Examiner*—Toan C To
*Assistant Examiner*—George D. Spisich
(74) *Attorney, Agent, or Firm*—McGlew and Tuttle, P.C.

(57) ABSTRACT

A stabilizer arrangement is provided for a motor vehicle with a stabilizer (1), which is connected to the vehicle chassis and which is connected, on each side of the vehicle, to a spring-mounted wheel carrier part with a piston-cylinder unit (4, 4'). Each of the piston-cylinder units (4, 4') includes at least one piston (8), which is movably arranged in a cylinder (7) and which splits the cylinder into a first and a second cylinder chamber (7a, 7b). The cylinder chambers are separate from one another. The piston-cylinder units (4, 4') are respectively connected in an articulated manner, at one end, to an end of the stabilizer 1 and, at the other end, to a spring-mounted wheel carrier part. The piston (8) has a connecting line (14) that connects the first and second cylinder chambers. The respective connecting line (14) has a nonreturn valve (15), which acts in one direction. The piston (8) can be moved into at least one end position.

20 Claims, 5 Drawing Sheets

U.S. PATENT DOCUMENTS

| | | | |
|---|---|---|---|
| 5,035,306 A | * 7/1991 | Ashiba | 188/282.3 |
| 5,217,245 A | 6/1993 | Guy | |
| 5,431,259 A | * 7/1995 | Mizutani et al. | 188/266.4 |
| 5,472,070 A | * 12/1995 | Feigel | 188/266.6 |
| 5,586,627 A | * 12/1996 | Nezu et al. | 188/266.6 |
| 5,934,422 A | * 8/1999 | Steed | 188/318 |
| 6,213,261 B1 | * 4/2001 | Kunkel | 188/314 |

FOREIGN PATENT DOCUMENTS

| | | |
|---|---|---|
| DE | 41 25 285 C2 | 12/1996 |
| DE | 101 34 715 A1 | 2/2003 |
| EP | 1 000 782 A2 | 5/2000 |

\* cited by examiner

STABILIZER ARRANGEMENT FOR A MOTOR VEHICLE WITH ADJUSTABLE ROCKER PENDULUM

CROSS REFERENCE TO RELATED APPLICATIONS

This application is a United States National Phase application of International Application PCT/DE2005/000910 and claims the benefit of priority under 35 U.S.C. § 119 of German Patent Application DE 10 2004 025 806.6 filed May 24, 2004, the entire contents of which are incorporated herein by reference.

FIELD OF THE INVENTION

The present invention pertains to a stabilizer arrangement for a motor vehicle, whereby an adjustable piston-cylinder unit, which is connected in an articulated manner to a spring-mounted wheel carrier part, is arranged at each of the ends of the stabilizer.

BACKGROUND OF THE INVENTION

In modern motor vehicles, soft chassis springs are used for a high driving comfort. In combination with correspondingly designed shock absorbers, such an improved ground contact is guaranteed in case of road unevennesses. The unfavorable increase in the rolling angle in curves which occurs in this case is compensated by the use of stabilizers, whereby the stabilizers are attached to the vehicle chassis and are connected in an articulated manner at the ends to a spring-mounted wheel carrier part, e.g., a suspension arm or a rigid axle via a rocker pendulum each. However, the possible axle twisting is reduced by the use of stabilizers, since they restrict an inward deflection in the opposite direction of the wheels of an axle. Therefore, it is especially desirable for off-road vehicles, so-called SUVs, to make it possible to influence the stabilizer function during off-road driving. This can be guaranteed by the use of switchable components, such that the wheels of an axle can deflect from one another independently. In this way, all wheels of the vehicle hold contact with the ground and can transmit propulsive forces.

There is a possibility of using switchable components in the use of hydraulically length-variable adjusting elements, such as, e.g., piston-cylinder units, instead of fixed rocker pendulums, as this is disclosed, e.g., in U.S. Pat. No. 5,217, 245. The length-variable piston-cylinder units arranged between the stabilizer and the motor vehicle chassis show a piston with through piston rod held movably in the cylinder, whereby the piston splits the cylinder into a first and a second cylinder chamber. The first and second cylinder chambers are connected to one another via an external bypass line, which can be blocked and unblocked by means of a valve, arranged outside of the cylinder, whereby two other, internal bypass lines are arranged in this line, each of which connects one end area of the cylinder to a middle area of the cylinder. In the middle area, the connections of the two other internal bypass lines are spaced apart from one another, and a nonreturn valve each is arranged in these internal bypass lines in such a way that only a flow of hydraulic fluid from the middle area of the cylinder into the end area of the cylinder is made possible. In case of an open connection of the external bypass line, the piston can move freely in the cylinder, such that the stabilizer action is neutralized. If the piston is located outside of the middle position and if the external bypass line is closed, the piston can only move in the direction of the middle position, since hydraulic fluid cannot reach the middle area or the other end area from the end areas via the nonreturn valves. As soon as the piston reaches its middle position, it is fixed in same, since an exchange of fluid between the cylinder chambers is no longer possible.

The drawback of this embodiment is especially that the middle position, in which the piston is fixed and thus a stabilizer action is created, cannot be defined precisely. Considerable tolerances are given here because of the connecting dimensions and the connecting holes.

Another embodiment of a switchable rocker pendulum for a stabilizer arrangement of a motor vehicle is disclosed in U.S. Pat. No. 4,973,077, whereby here as well a bypass line, which can be blocked and unblocked by means of a valve outside of the cylinder, connects two cylinder chambers, which are separated by a piston, to one another in their end areas. Two compression springs, which rest against the respective cylinder bottom, are arranged on both sides of the piston within the cylinder. In this case, a connecting hole, in which two nonreturn valves with opposite action are arranged, is arranged in the piston. If the piston is located outside of its middle position, these nonreturn valves make possible an exchange of fluid between the two cylinder chambers with the bypass line blocked, such that the piston can move into its middle position by means of the spring force of the compression springs. In the middle position, the piston is held there since the nonreturn valves in the piston are closed and thus an exchange of fluid may no longer take place. The stabilizer action is present in this position.

The drawback of this arrangement is again that the middle position of the piston for the stabilizer position cannot be accurately defined. In addition to tolerances present in the system—in particular, the springs may have different values - there is the wear of the springs, which leads to additional deviations from the middle position. Moreover, this arrangement has a very expensive design consisting of many individual parts.

SUMMARY OF THE INVENTION

The object of the present invention is therefore to create a stabilizer arrangement for a motor vehicle with a switchable piston-cylinder unit, which has a structure having a simple design with a position for fixing the piston that can be determined accurately.

A stabilizer arrangement for a motor vehicle has a stabilizer, which is connected to the vehicle chassis and which is connected to a spring-mounted wheel carrier part on each side of the vehicle by means of a piston-cylinder unit. The piston-cylinder units consist of at least one piston arranged movably in a cylinder, which piston splits the cylinder into a first and a second cylinder chamber, and are connected in an articulated manner, at one end, to an end of the stabilizer, and at the other end, to the spring-mounted wheel carrier part. According to the present invention, a connecting line each, which connects the first and second cylinder chambers to one another, is embodied in the piston of the piston-cylinder unit. A nonreturn valve acting in one direction is arranged in this connecting line, whereby the piston can be moved in at least one end position.

Because of the nonreturn valve which is arranged in the connecting line connecting the two cylinder chambers, the hydraulic fluid can only reach from one cylinder chamber into the other, but not in the reverse direction. This means that when the piston is impacted with a load, for example, by an inward or outward deflecting motion, the piston can move in the cylinder only in one direction, provided that there is no other connection between the two cylinder chambers. The piston is moved into one end position, which advantageously is formed by the cylinder housing itself or a stop which is arranged separately in or at the cylinder. This end position is precisely defined and can always be repeatably found.

In a particularly advantageous embodiment, a bypass line connecting the two cylinder chambers is arranged outside of the two cylinder chambers, whereby another valve is arranged in this bypass line, which can block or release the flow of hydraulic fluid in this bypass line. Hereby, a nonreturn valve, which can be actuated electromagnetically, may preferably be used, which, in relation to the nonreturn valve arranged in the piston, acts in the opposite direction.

If the nonreturn valve arranged in the bypass line is in an unblocked position and thus releases the flow of hydraulic fluid from one cylinder chamber to another, the piston is freely movable in the cylinder. When the piston moves in one direction, the hydraulic fluid can flow from one cylinder chamber into the other cylinder chamber via the bypass line, whereas, in case of a reverse motion of the piston, the hydraulic fluid reaches from one cylinder chamber to the other cylinder chamber via the connecting line in the piston. The stabilizer coupled with the piston-cylinder units is inactivated in this case, such that the wheels of an axle can twist against one another.

If the bypass line is now blocked, the hydraulic fluid can still be exchanged between the cylinder chambers only in one direction, such that the piston can only move in one direction. Because of the inward and outward deflecting motion of the wheels, the pistons are consequently moved into an end position, from which they can no longer move. The stabilizer action again becomes completely noticeable in this position, in which forces are transmitted from one side of the vehicle to the other. The advantage of this arrangement is that the stabilizer action can be reproduced without the use of actuators, such as, e.g., hydraulic pumps. If the electromagnetic actuation of the nonreturn valves in the bypass line is used in such a way that, in the currentless state, the nonreturn valve is located in the blocked position, a safety function is created, since, in the case of a power outage, the system automatically restores the stabilizer action.

In a preferred embodiment, the piston is embodied as double-acting with a through piston rod, as a result of which an identical cross section is given in the first and second cylinder chambers, such that no other compensating elements are needed.

In another embodiment the piston rod is embodied on one side on the piston, as a result of which the piston-cylinder unit has a considerably smaller structure and thus requires a smaller space for the components. However, since there are cross sections of different sizes of the displacement volume on both sides of the piston in this embodiment, a compensating piston with a compressed gas chamber is needed in order to accommodate, for example, that displaced hydraulic fluid that cannot be accommodated by the respective other cylinder chamber.

Another possible embodiment of the present invention is to use two pistons arranged separately in the cylinder, and an internal cylinder is arranged between the pistons for mounting a compensating piston and the pressure compensation chamber. One of the two pistons is connected to the stabilizer, whereas the other piston is connected to a wheel carrier part. Both pistons are provided with a nonreturn valve according to the present invention and may move only in the same direction in their respective end position with the bypass line blocked, which represents a connection between the cylinder chambers. On the other hand, with the bypass line unblocked, both pistons can move freely in the cylinder.

The present invention is again explained in greater detail below on the basis of various exemplary embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
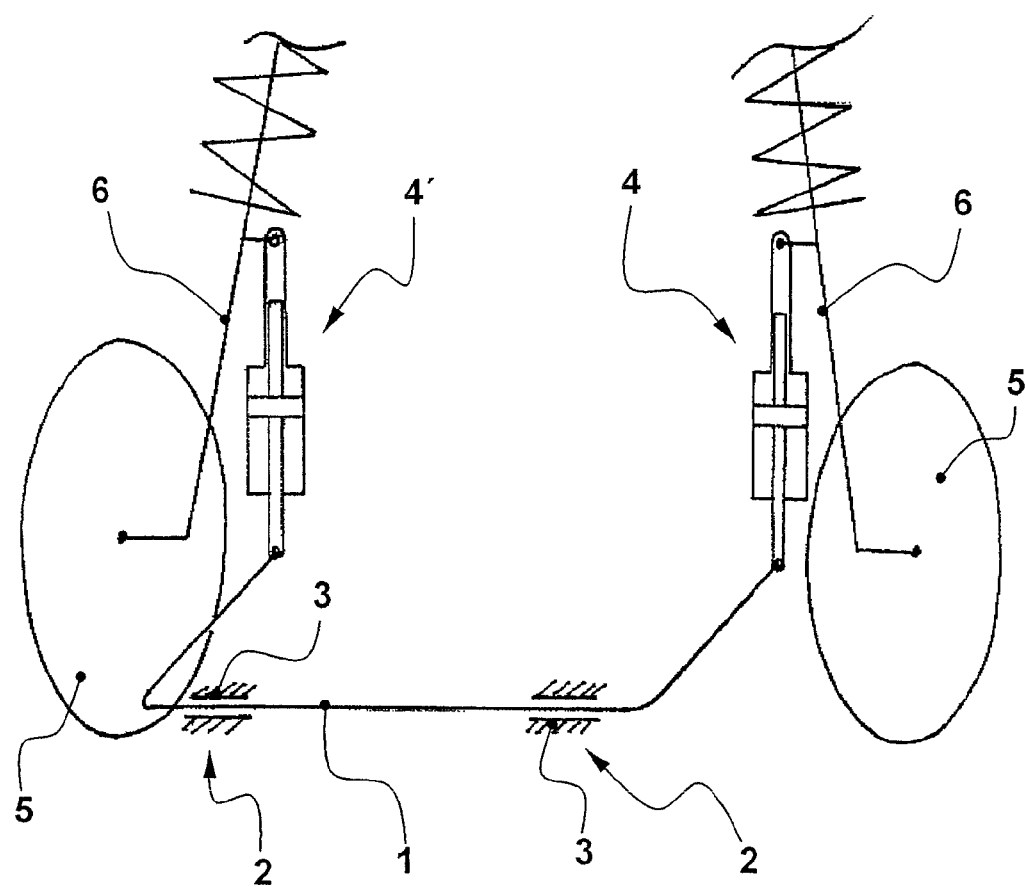
FIG. 1 is a schematic view of a stabilizer arrangement according to the invention, with piston-cylinder units for a motor vehicle.

Referring to the drawings in particular, FIG. 1 shows an exemplary schematic stabilizer arrangement, whereby a stabilizer 1 is pivotably held on a vehicle chassis 3 in mounting points 2. At each of its ends, the stabilizer 1 is connected to a piston-cylinder unit 4 in an articulated manner. At its end facing away from the stabilizer 1, each piston-cylinder unit 4 is connected in an articulated manner to a spring-mounted wheel carrier part, for example, to a shock absorber part 6 connected to a vehicle wheel 5.

Figure 2:
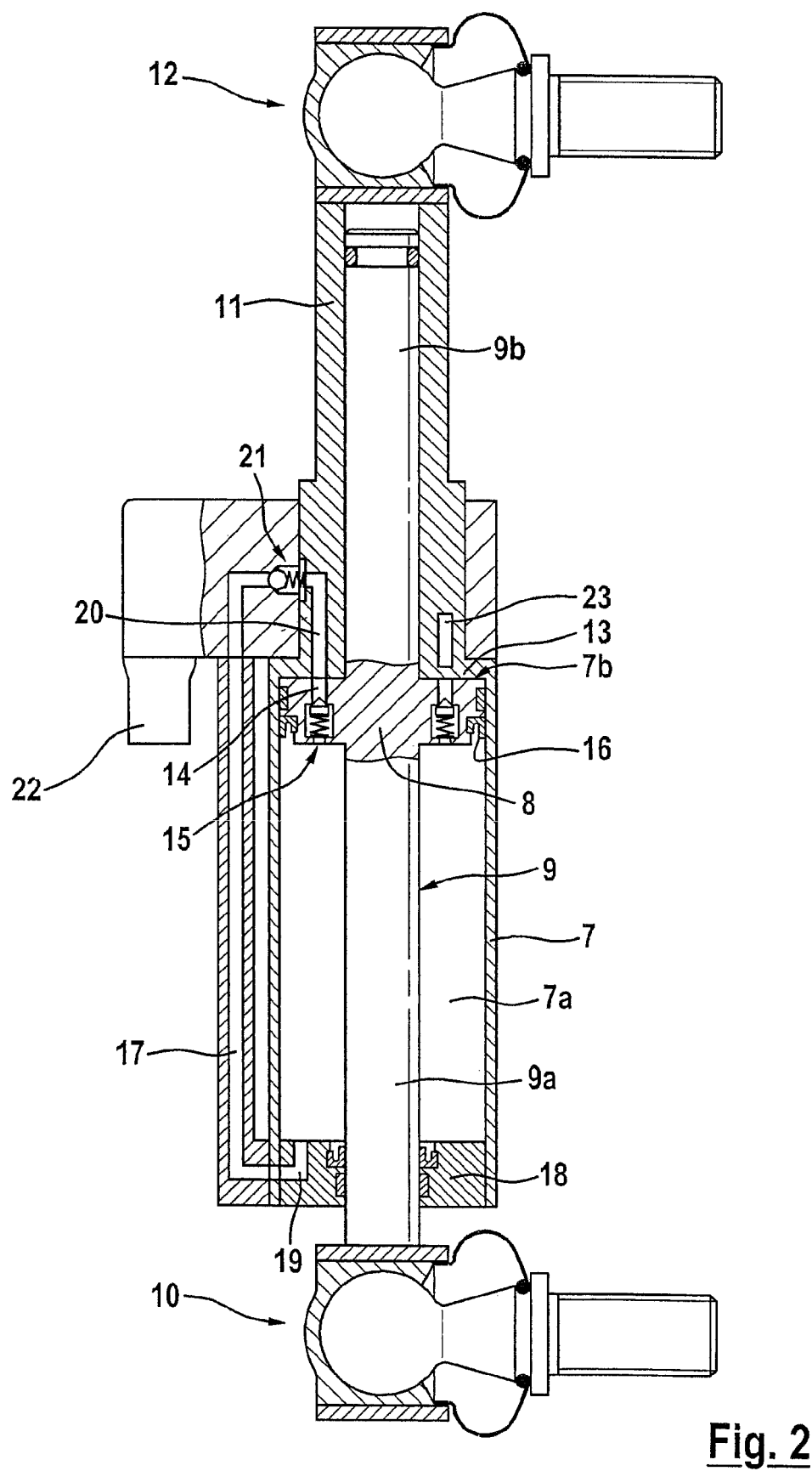
FIG. 2 is a sectional view of a piston-cylinder unit used according to the present invention in a first embodiment with through piston rod.

The piston-cylinder units 4 hereby replace fixed rocker pendulums and are advantageously designed as synchronous cylinders in the first exemplary embodiment shown in FIG. 2. A piston 8 arranged in a cylinder 7 has a two-sided piston rod 9, whereby the first piston rod side 9a protrudes from the cylinder 7 and is provided at its end with a mount 10 for connection to the stabilizer 1 in an articulated manner. The second piston rod side 9b runs in a sleeve 11 arranged in the cylinder 7, and the sleeve is embodied as one piece with the cylinder 7. As an alternative, the sleeve 11 can be screwed into the cylinder 7, for example, as a separate component. On the side facing towards the shock absorber 6, the sleeve 11 is provided with another mount 12 for connection to the shock absorber 6 in an articulated manner.

The piston 8 splits the cylinder into a first and a second cylinder chamber 7a and 7b, whereby in the end position of the piston 8 shown in FIG. 2, the volume of the second cylinder chamber 7b is zero. The piston 8 is located in this end position when resting against the cylinder bottom 13. In the piston 8 is embodied a connecting line 14, in which is arranged a spring-loaded nonreturn valve 15. In the view shown according to FIG. 2, two connecting lines 14 are shown with a nonreturn valve 15 each, whereby the number of the connecting lines 14 can be randomly selected depending on the requirements of the volume flow. In the fitting position shown here, a flow of the hydraulic fluid provided in the cylinder 7 is possible from the second cylinder chamber 7b into the first cylinder chamber 7a, whereas the flow is blocked in the opposite direction. The piston 8 is sealed against the cylinder 7 by means of gaskets 16.

The first and second cylinder chambers 7a, 7b are connected to one another via a bypass line 17 that is arranged outside of the cylinder 7. For this purpose, a connecting hole 19, 20 each is provided in the cylinder bottom 13, 18, which are guided laterally out of the cylinder 7. In the bypass line 17 is arranged an electromagnetically switchable second nonreturn valve 21, whereby this nonreturn valve 21, in the unblocked switch position, in which the nonreturn valve 21 is supplied with current, blocks the flow from the second cylinder chamber 7b into the first cylinder chamber 7a and makes the flow possible in the opposite direction. If the electromagnetically switchable nonreturn valve 21 is currentless, the flow is blocked both from the second cylinder chamber 7b into the first cylinder chamber 7a and in the reverse direction via the bypass line 17. The electromagnetically switchable nonreturn valve 21 has a plug-type connection 22 for signal and current transmission for actuating the electromagnets. The direction of action of the nonreturn valve 21 is opposite to the nonreturn valve 15 arranged in the piston 8.

A limit switch 23 is arranged in the cylinder bottom 13, which serves as a stop for the piston 8 in the end position, for reproduction of the end position.

Figure 3A:
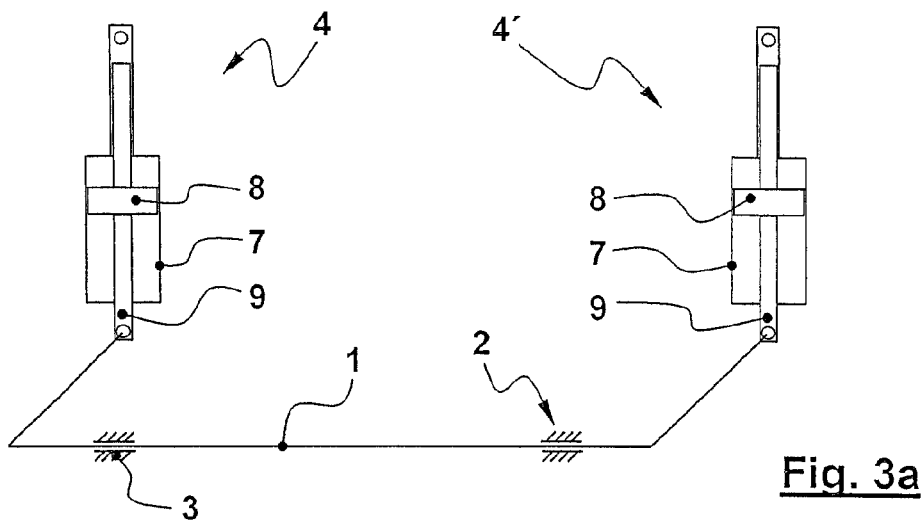
FIG. 3a is a schematic view of a stabilizer arrangement with piston-cylinder units with stabilizer action present.

In the starting position, the pistons 8 of the two piston-cylinder units 4, 4' rest against the cylinder bottom 13, which is used as a stop, and the electromagnetically switchable nonreturn valve is currentless, i.e., the nonreturn valve 21 is blocked, such that no hydraulic fluid can flow through the bypass line 17. In this position, the pistons 8 are held at the cylinder bottom 13, since no hydraulic fluid can reach from the first cylinder chamber 7a into the second cylinder chamber 7b due to the nonreturn valve 15 or the connecting line 14. In this position, the piston-cylinder units 4, 4' are held in the position shown in FIG. 3a, such that the full stabilizer action is present. Therefore, forces and torques can be transmitted from one side of the vehicle to the other to reduce the tendency of the vehicle to roll.

Figure 3B:
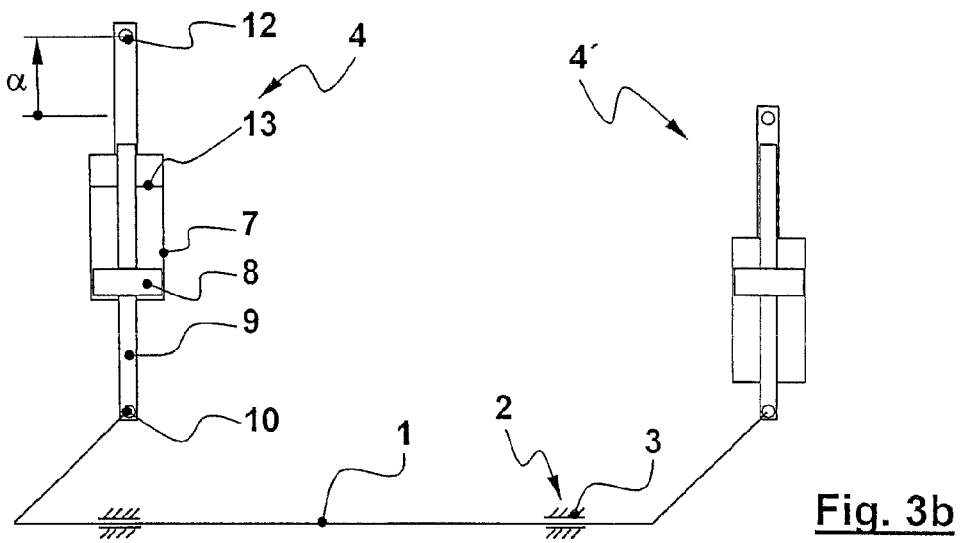
FIG. 3b is a schematic view of a stabilizer arrangement with piston-cylinder units with switched-off stabilizer action and an inwardly deflected wheel.

If the nonreturn valve 21 is now supplied with current, the nonreturn valve is unblocked, such that hydraulic fluid may flow from the first cylinder chamber 7a into the second cylinder chamber 7b due to the bypass line 17. Since hydraulic fluid may also flow from the second cylinder chamber 7b into the first cylinder chamber 7a via the nonreturn valve 15 arranged in the piston 8, the piston 8 is freely movable in the cylinder 7. This state is present in both piston-cylinder units 4, 4', such that the stabilizer 1 does not perform any action. According to an inward deflection α of a wheel shown in FIG. 3b, the cylinder 7 is raised up via the upper mount 12, whereas the piston 8 with the piston rod 9 remains in its position via the lower mount 10. The stabilizer 1 is not impacted with torque, such that no torque is transmitted to the other side of the vehicle.

Figure 3C:
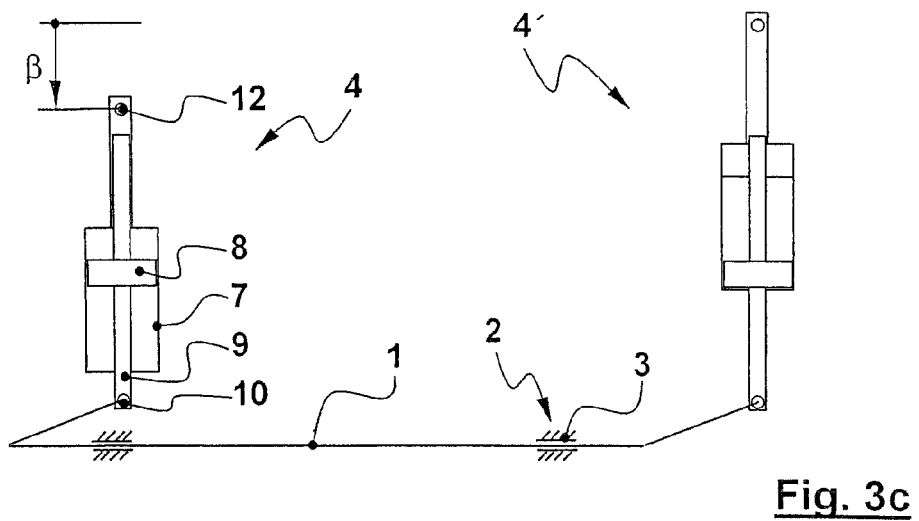
FIG. 3c is a schematic view of a stabilizer arrangement with piston-cylinder units with switched-off stabilizer action and an outwardly deflected wheel.

If a vehicle wheel 5 deflects outwardly by a path β according to FIG. 3c, the outward deflection motion via the piston-cylinder unit 4, in which the piston 8 rests against the cylinder bottom 13 in its end position, is transmitted to the stabilizer 1. The stabilizer 1 rotates without any transmission of torque to the other side of the vehicle, since the piston 8 in the piston-cylinder unit 4' is likewise freely movable with the nonreturn valve 21 supplied with current and is drawn in the direction of the cylinder bottom 18 in the cylinder 7. Such an increased axle twisting is possible. This current-supplied state of the nonreturn valves 21 of the two piston-cylinder units 4, 4' with an increased axle twisting is used in off-road travel of a vehicle, among other things.

If the stabilizer action shall now be restored, e.g., for road travel, the nonreturn valves 21 at the piston-cylinder units 4, 4' are switched to currentless, such that each nonreturn valve 21 is blocked and the flow of hydraulic fluid is blocked in both directions, i.e., from the first cylinder chamber 7a into the second cylinder chamber 7b and vice versa. Hydraulic fluid may now only flow from the second cylinder chamber 7b into the first cylinder chamber 7a via the nonreturn valve 15 arranged in the piston 8. This means that the piston 8 in the cylinder may only move in the direction of the cylinder bottom 13. Due to inward and outward deflection motions of the vehicle wheels 5, which are transmitted to the cylinder 7 and the piston rod 9, the piston rod 9 or the piston 8 is pressed in the direction of the cylinder bottom 13, since the other direction of motion of the piston 8 is blocked as is known. The piston 8 is pushed so far in the direction of the cylinder bottom 13 until the piston 8 rests against the cylinder bottom 13. This represents the end position of the piston 8. The starting position is now again reached.

Since the cylinder bottom 13 acts as the fixed contact for the piston 8 in its end position, a high repeating accuracy for reaching the end position is thus guaranteed, with which at the same time the functional safety of the stabilizer is guaranteed after it is switched on. It is also essential here that the system operate without any electrical source or actuator in order to reach its starting position. Thus, at the same time, a fail-safe function is guaranteed, since, in case of a power outage, the nonreturn valve 21 is blocked, such that the piston 8 moves in its end position and the stabilizer function is guaranteed. This structural unit, in which no changes to the stabilizer are otherwise necessary, thus forms a closed, self-sufficient system.

Figure 4:
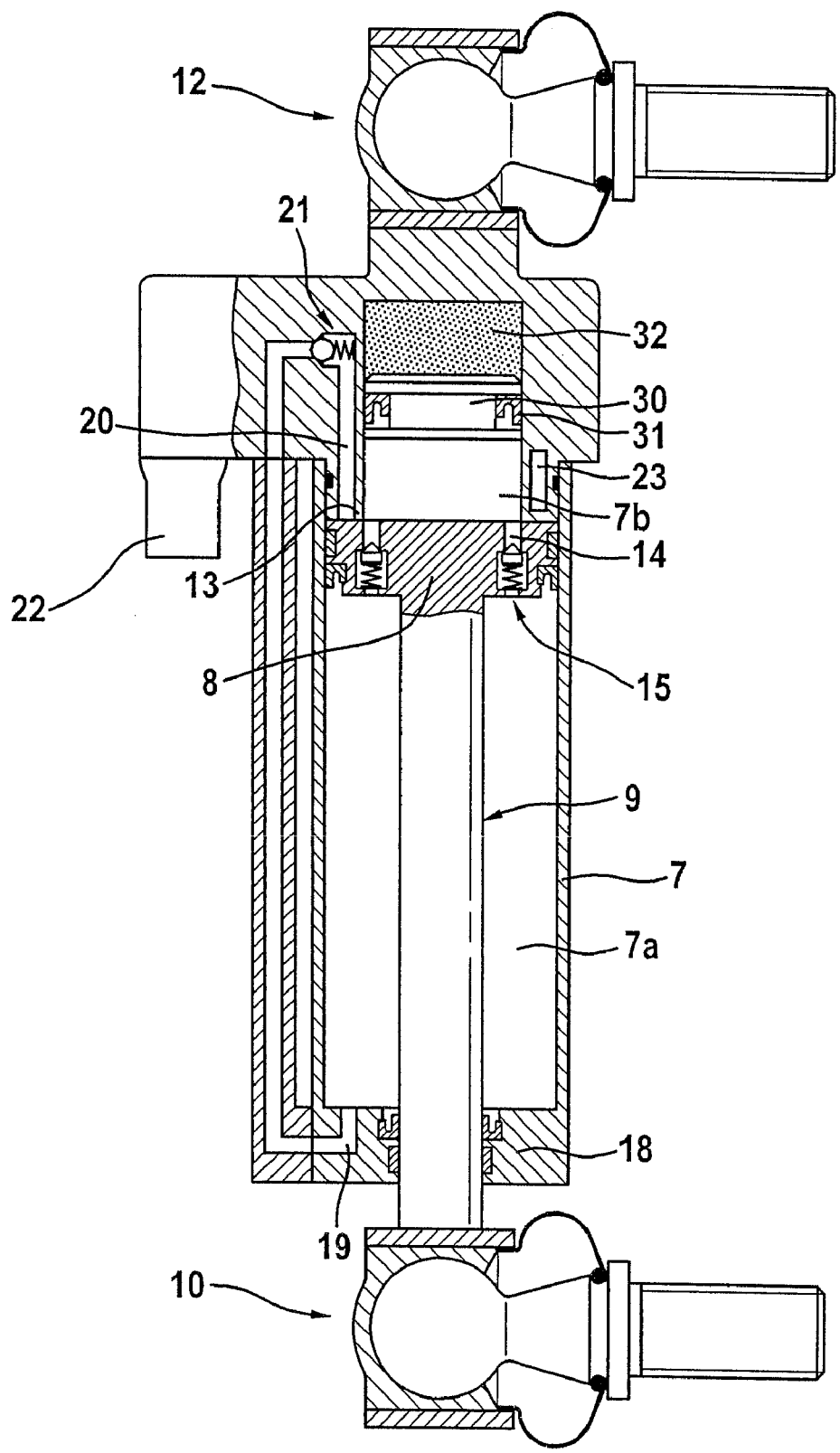
FIG. 4 is a sectional view of a piston-cylinder unit used according to the present invention in a second embodiment with a pressure compensation chamber.

FIG. 4 shows another exemplary embodiment of the design of the adjustable rocker pendulum according to the present invention. The piston-cylinder unit 4 here does not have a through piston rod, but rather a compensating piston 30 on the side of the second cylinder chamber 7b, which is arranged movably in the second cylinder chamber 7b via a gasket 31. A compressed gas chamber 32, which is filled with a compressible gas, is located on the side of the compensating piston 30 facing away from the second cylinder chamber 7b.

By omitting the through piston rod, the compensating piston 30 with the compressed gas chamber 32 is necessary because of the different displacement volumes of the two cylinder chambers 7a and 7b. The remaining structure of the arrangement and the mode of operation correspond to the embodiment shown in FIG. 2. The nonreturn valve 15 arranged in the piston 8 is likewise present here, as are the bypass line 17 and the second electromagnetically switchable nonreturn valve 21 arranged in the bypass line 17. A fixed stop for the end position of the piston 8 is likewise given here for the piston 8 by means of the cylinder bottom 13. The reduced external dimensions of the rocker pendulum and of the thus needed space for components are an essential advantage of this arrangement.

Figure 5:
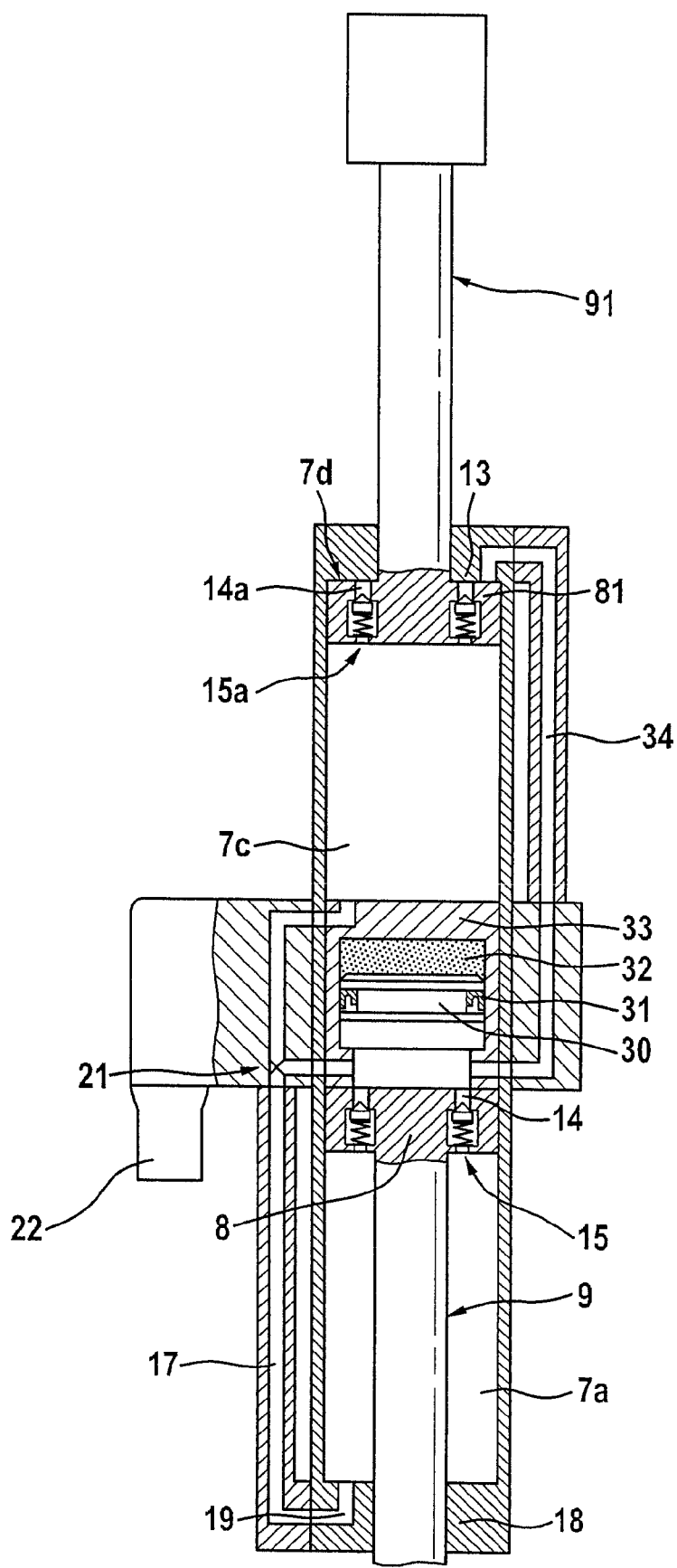
FIG. 5 is a sectional view of a piston-cylinder unit used according to the present invention in a third embodiment with double piston and pressure compensation chamber.

FIG. 5 shows another embodiment according to the present invention of an adjustable rocker pendulum with a double piston 9, 91 and a pressure compensation chamber 32. Piston rods 9 and 91, which can be moved independently of one another and each of which has a piston 8 and 81, are arranged in the cylinder 7 both on the stabilizer side and on the vehicle chassis side. At least one connecting line 14, 14a each with a nonreturn valve 15, 15a arranged therein is embodied in both pistons 8, 81, whereby both nonreturn valves 15, 15a are directed in the same direction of action, in relation to the cylinder 7. Between the two pistons 8, 81, an internal cylinder 33 is rigidly inserted in the cylinder 7 by means of, for example, gluing, soldering or pressing in, and the compensating piston 30 is arranged movably and the compressed gas chamber 32 is located in this internal cylinder 33, which is open on only one side. The second cylinder chamber 7b is located directly adjacent on the side of the compensating piston 31 facing away from the compressed gas chamber. At the same time, the internal cylinder 33 also forms the stop for the lower piston 8 facing towards the stabilizer.

The bypass line 17 not only connects the first and second cylinder chambers 7a, 7b to one another, but also at the same time represents a connection to a third cylinder chamber 7c embodied between the piston 81 and the internal cylinder 33. In addition, another connecting line 34, which connects the second cylinder chamber 7b to the fourth cylinder chamber 7d located on the side of the piston 81 facing away from the third cylinder chamber 7c, is provided outside of the cylinder 7. In the blocked position, the electromagnetically switchable nonreturn valve 21 arranged in the bypass line 17, which is only hinted at here, blocks the flow between all three cylinder chambers 7a, 7b and 7c, such that both pistons 8, 81 can only move in one, common direction until they both rest against the stop in their end position and remain there. The piston 8 rests against the internal cylinder 33 and the piston 81 rests against the cylinder bottom 13 of the cylinder 7. By contrast, if the nonreturn valve 21 is released, both pistons 8, 81 are freely movable in the cylinder 7, such that an increased axle twisting without stabilizer action is possible. Otherwise, the mode of operation of this embodiment with the double piston is identical to the embodiments according to FIG. 2 and FIG. 4.

Another possible variant is the integration of the bypass line 17 or even of the connecting line 34 of the third exemplary embodiment in the cylinder 7, such that possibly separate components may be done away with.

Instead of the adjustable rocker pendulums, it would also be conceivable to embody the essential idea of the present invention in a rotatory design, for example, with a pivoting space, which is split by a pivotable wing provided with nonreturn valves. Such a system might then be directly integrated in a stabilizer.

While specific embodiments of the invention have been shown and described in detail to illustrate the application of the principles of the invention, it will be understood that the invention may be embodied otherwise without departing from such principles.

The invention claimed is:

1. A stabilizer arrangement for a motor vehicle, the stabilizer comprising:
    a stabilizer connected to the vehicle chassis;
    spring-mounted wheel carrier parts;
    plural piston-cylinder units each of said piston-cylinder units including a piston movably arranged in a cylinder to define within each said cylinder first and second cylinder chambers, which are separate from one another each of said piston-cylinder units being connected in an articulated manner, at one end, to an end of said stabilizer, and at the other end, to one of said spring-mounted wheel carrier parts, each said piston having a connecting line that connects said first and second cylinder chambers and a first nonreturn valve which acts in one direction, each said piston being movable into at least one end position, each of said piston-cylinder units having a bypass line arranged outside of said first cylinder chamber and said second cylinder chamber, said bypass line connecting said two cylinder chambers, each of said piston-cylinder units having a second nonreturn valve arranged in said bypass line, said second nonreturn valve blocking one or more of a flow of fluid from said first cylinder chamber to said second cylinder chamber and the flow of fluid from said second cylinder chamber to said first cylinder chamber with said second nonreturn valve in a blocking position, wherein fluid in said second cylinder chamber moves from said second cylinder chamber to said first cylinder chamber via said first nonreturn valve with said second nonreturn valve in said blocking position.

2. A stabilizer arrangement in accordance with claim 1, wherein said nonreturn valve arranged in said bypass line in relation to said at least one nonreturn valve arranged in said piston acts in the opposite direction.

3. A stabilizer arrangement in accordance with claim 1, wherein said second nonreturn valve arranged in said bypass line is movable between said blocking position and an unblocked position, wherein fluid flows from said first cylinder chamber to said second cylinder chamber via said bypass line with said second nonreturn valve in said unblocked position, wherein fluid is provided in said second cylinder chamber with said second nonreturn valve in said unblocked position, said first cylinder chamber receiving said fluid in said second cylinder chamber with said second nonreturn valve via said first nonreturn valve with said second nonreturn in said blocking position such that said piston is in said at least one end position, said piston moving within said cylinder with said second nonreturn valve in said unblocked position.

4. A stabilizer arrangement in accordance with claim 3, wherein said nonreturn valve arranged in said bypass line can be unblocked or blocked by means of an electromagnetic actuation.

5. A stabilizer arrangement in accordance with claim 1, wherein with said nonreturn valve arranged unblocked in said bypass line, said piston can move freely in said cylinder, and with said nonreturn valve blocked, said piston can only be moved in the direction of a limit stop.

6. A stabilizer arrangement in accordance with claim 1, wherein the at least one end position of said piston is formed by a cylinder housing or a cylinder bottom, which closes the cylinder housing.

7. A stabilizer arrangement in accordance with claim 1, wherein a limit switch is arranged in said cylinder.

8. A stabilizer arrangement in accordance with claim 1, wherein said piston is embodied as double-acting with a through piston rod.

9. A stabilizer arrangement in accordance with claim 1, wherein said second nonreturn valve is arranged in said bypass line at a position above said second cylinder chamber.

10. A motor vehicle stabilizer arrangement comprising:
    a stabilizer connected to the vehicle chassis;
    a first spring-mounted wheel carrier part;
    a second spring-mounted wheel carrier part;
    a first piston-cylinder unit including a first unit piston arranged in a first unit cylinder to define within said first unit cylinder a first unit first cylinder chamber and a first unit second cylinder chamber separate from said first unit first cylinder chamber, said first piston-cylinder unit being connected in an articulated manner to a first end of said stabilizer and being connected in an articulated manner to said first spring-mounted wheel carrier part, said first unit piston having a first unit connecting line that connects said first unit first cylinder chamber to said first unit second cylinder chamber and having a first unit first nonreturn valve acting in one direction, said first unit piston being moveable into at least one end position, said first piston-cylinder unit comprising a first unit bypass line arranged outside of said first unit first cylinder chamber and said first unit second cylinder chamber, said first unit bypass line connecting said first unit first cylinder chamber and said first unit second cylinder chamber, said first piston-cylinder unit having a first unit second nonreturn valve arranged in said first unit bypass line, said first unit second nonreturn valve blocking a flow of fluid from said first unit first cylinder chamber to said first unit second cylinder chamber and the flow fluid from said first unit second cylinder chamber to said first unit first cylinder chamber with said first unit second nonreturn valve in a blocking position, wherein fluid in said first unit second cylinder chamber flows from said first unit second cylinder chamber to said first unit first cylinder chamber via said first unit first nonreturn valve with said first unit second nonreturn valve in said blocking position; and a second piston-cylinder unit including a second unit piston arranged in a second unit cylinder to define within said second unit cylinder a second unit first cylinder chamber and a second unit second cylinder chamber separate from said second unit first cylinder chamber, said second piston-cylinder unit being connected in an articulated manner to a second end of said stabilizer and being connected in an articulated manner to said second spring-mounted wheel carrier part, said second unit piston having a second unit connecting line that connects said second unit first cylinder chamber to said second unit second cylinder chamber and having a second unit nonreturn valve acting in one direction, said second unit piston being moveable into at least one end position, said second piston-cylinder unit comprising a second unit bypass line arranged outside of said second unit first cylinder chamber and said second unit second cylinder chamber, said second unit bypass line connecting said second unit first cylinder chamber and said second unit second cylinder chamber, said second piston-cylinder unit having a second unit second nonreturn valve arranged in said second unit bypass line, said second unit second nonreturn valve blocking a flow of fluid from said second unit first cylinder chamber to said second unit second cylinder chamber and the flow fluid from said second unit second cylinder chamber to said second unit first cylinder chamber with said second unit second nonreturn valve in a blocking position, wherein fluid in said second unit second cylinder chamber flows from said second unit second cylinder chamber to said second unit first cylinder chamber via said second unit first nonreturn valve with said second unit second nonreturn valve in said blocking position.

11. A stabilizer arrangement in accordance with claim 10, wherein said first unit second nonreturn valve is arranged in said first unit bypass line at a position above said first unit second cylinder chamber, said second unit second nonreturn valve being arranged in said second unit bypass line at a position above said second unit second cylinder chamber.

12. A stabilizer arrangement in accordance with claim 10, wherein said first unit second nonreturn valve arranged in said first unit bypass line is movable from said blocking position to an unblocked position, wherein fluid flows from said first unit first cylinder chamber to said first unit second cylinder chamber via said first unit bypass line with said first unit second nonreturn valve in said unblocked position, wherein fluid is provided in said first unit second cylinder chamber with said first unit second nonreturn valve in said unblocked position, said first unit first cylinder chamber receiving said fluid in said first unit second cylinder chamber with said first unit second nonreturn valve via said first unit first nonreturn valve with said first unit second nonreturn in said blocking position such that said first unit piston is in said at least one end position, said first unit piston moving within said first unit cylinder with said first unit second nonreturn valve in said unblocked position.

13. A stabilizer arrangement in accordance with claim 12, wherein said second unit second nonreturn valve arranged in said second unit bypass line is movable from said blocking position to an unblocked position, wherein fluid flows from said second unit first cylinder chamber to said second unit second cylinder chamber via said second unit bypass line with said second unit second nonreturn valve in said unblocked position, wherein fluid is provided in said second unit second cylinder chamber with said second unit second nonreturn valve in said unblocked position, said second unit first cylinder chamber receiving said fluid in said second unit second cylinder chamber with said second unit second nonreturn valve via said second unit first nonreturn valve with said second unit second nonreturn in said blocking position such that said second unit piston is in said at least one end position, said second unit piston moving within said second unit cylinder with said second unit second nonreturn valve in said unblocked position.

14. A stabilizer arrangement in accordance with claim 13, wherein said first unit second nonreturn valve arranged in said first unit bypass line moves between said unblocked position and said blocking position by means of an electromagnetic actuation, wherein said second unit second nonreturn valve arranged in said second unit bypass line between said unblocked position to said blocking position via electromagnetic actuation.

15. A stabilizer arrangement in accordance with claim 10, wherein said first unit piston moves freely in said first unit cylinder with said first unit second nonreturn valve in said unblocked position, said first unit piston being movable in the direction of a first unit limit stop with said first unit second nonreturn valve in said blocking position, wherein said second unit piston moves freely in said second unit cylinder with said second unit second nonreturn valve in said unblocked position, said second unit piston being movable in the direction of a second unit limit stop with said second unit second nonreturn valve in said blocking position.

16. A stabilizer arrangement in accordance with claim 10, wherein the at least one end position of said first unit piston is formed by a first unit cylinder housing or a first unit cylinder bottom, which closes the first unit cylinder housing, wherein the at least one end position of said second unit piston is formed by a second unit cylinder housing or a second unit cylinder bottom, which closes the second unit cylinder housing.

17. A stabilizer arrangement for a motor vehicle, the stabilizer comprising:
 a stabilizer connected to the vehicle chassis;
 spring-mounted wheel carrier parts;
 plural piston-cylinder units each of said piston-cylinder units including a piston movably arranged in a cylinder to define within each said cylinder first and second cylinder chambers, which are separate from one another each of said piston-cylinder units being connected in an articulated manner, at one end, to an end of said stabilizer, and at the other end, to one of said spring-mounted wheel carrier parts, each said piston having a connecting line that connects said first and second cylinder chambers and a first nonreturn valve which acts in one direction, each said piston being movable into at least one end position, each of said piston-cylinder units having a bypass line arranged outside of said first cylinder chamber and said second cylinder chamber, said bypass line connecting said two cylinder chambers, each of said piston-cylinder units having a second nonreturn valve arranged in said bypass line, said second nonreturn valve blocking a flow of fluid from said first cylinder chamber to said second cylinder chamber and the flow of fluid from said second cylinder chamber to said first cylinder chamber with said second nonreturn valve in a blocking position, wherein fluid in said second cylinder chamber flows from said second cylinder chamber to said first cylinder chamber via said first nonreturn valve with said second nonreturn valve in said blocking position, wherein said stabilizer transmits torque from one side of the motor vehicle to another side of the motor vehicle with said second nonreturn valve in said blocking position.

18. A stabilizer arrangement in accordance with claim 17, wherein said second nonreturn valve arranged in said bypass line is movable from said blocking position to an unblocked position, wherein fluid flows from said first cylinder chamber to said second cylinder chamber via said bypass line with said second nonreturn valve in said unblocked position, wherein fluid is provided in said second cylinder chamber with said second nonreturn valve in said unblocked position, said first cylinder chamber receiving said fluid in said second cylinder chamber with said second nonreturn valve via said first nonreturn valve with said second nonreturn valve in said blocking position such that said piston is in said at least one end position, wherein said stabilizer does not transmit torque from the one side of the motor vehicle to the another side of the motor vehicle with said second nonreturn valve in said unblocked position.

19. A stabilizer arrangement in accordance with claim 18, wherein said piston moves freely in said cylinder with said second nonreturn valve in said unblocked position, said piston moving only in the direction of a limit stop with said nonreturn valve in said blocking position.

20. A stabilizer arrangement in accordance with claim 17, wherein said nonreturn valve arranged in said bypass line can be unblocked or blocked by means of an electromagnetic actuation.

* * * * *